United States Patent [19]

Lamp'l et al.

[11] Patent Number: 4,517,698
[45] Date of Patent: May 21, 1985

[54] CARGO HANDLING RAMP

[76] Inventors: Thomas A. Lamp'l; Randall W. Eby, both of 8140 SW. 58 Ave., Miami, Fla. 33143

[21] Appl. No.: 438,392

[22] Filed: Jan. 5, 1983

[51] Int. Cl.³ .................. E01D 15/10; E01D 19/10
[52] U.S. Cl. .................... 14/72.5; 14/69.5; 182/113; 188/166
[58] Field of Search .......... 14/69.5, 71.1, 71.3, 14/71.5, 71.7, 72.5; 256/65, 59; 193/32, 40; 182/113; 188/62, 166

[56] References Cited

U.S. PATENT DOCUMENTS

| | | | |
|---|---|---|---|
| 1,650,442 | 11/1927 | Goldstein | 188/166 X |
| 2,112,900 | 4/1938 | McColly | 188/166 X |
| 2,635,889 | 4/1953 | Concello | 14/72.5 X |
| 2,979,177 | 4/1961 | Sullivan | 193/40 X |
| 3,452,718 | 7/1969 | Wight | 14/72.5 X |
| 3,768,600 | 10/1973 | Beck | 188/62 |
| 4,065,825 | 1/1978 | Cohen | 14/72.5 |
| 4,234,069 | 11/1980 | Seiz et al. | 193/40 X |
| 4,235,399 | 11/1980 | Shorey | 14/71.1 X |
| 4,304,518 | 12/1981 | Carder et al. | 14/71.3 X |
| 4,348,780 | 9/1982 | Angelo et al. | 14/71.3 X |

FOREIGN PATENT DOCUMENTS 710863 6/1954 United Kingdom ............ 14/71

Primary Examiner—James A. Leppink
Assistant Examiner—Beverly E. Hjorth
Attorney, Agent, or Firm—John C. Malloy

[57] ABSTRACT

A cargo handling ramp including a support frame and an inclined walkway provided with hand rails along the walkway and rollers beneath the frame for moving it over a surface wherein a mechanism is provided for raising and lowering the lowermost end of the walkway relative to the upper end of the walkway to adjust the incline of the walkway for use of the device in loading operations and wherein a rub rail type brake is provided to control rate of descent of wheeled standard size cartons or containers down the ramp to avoid dangerous situations.

11 Claims, 13 Drawing Figures

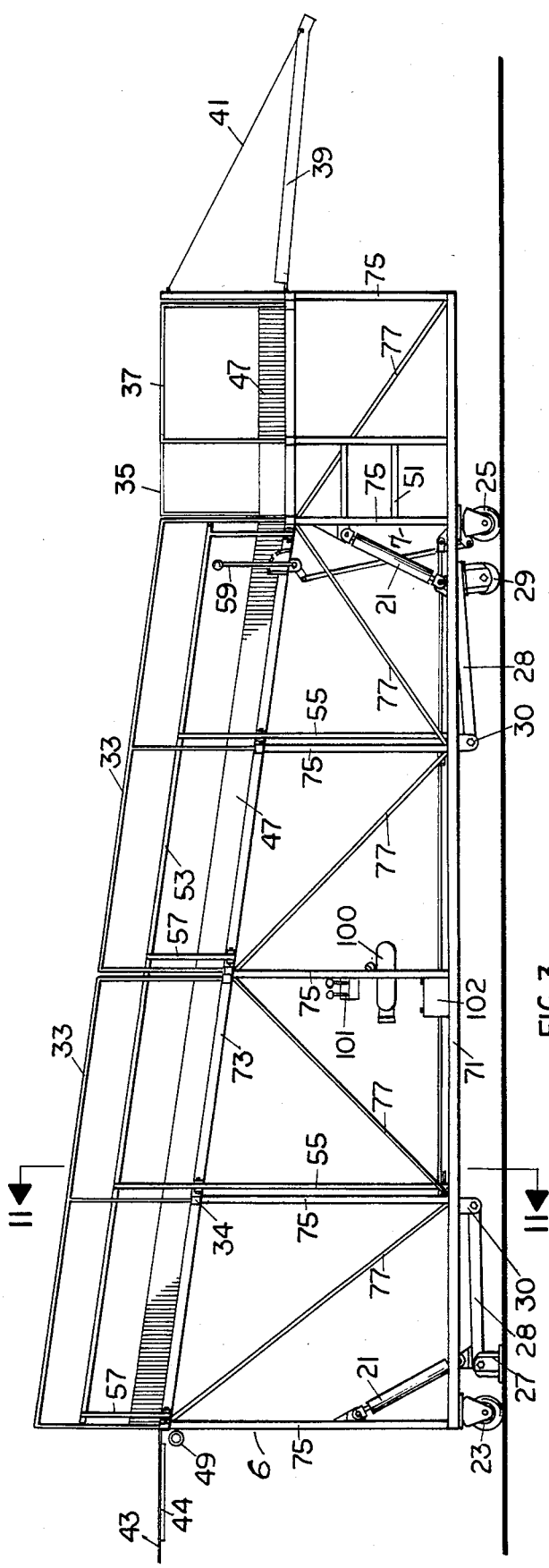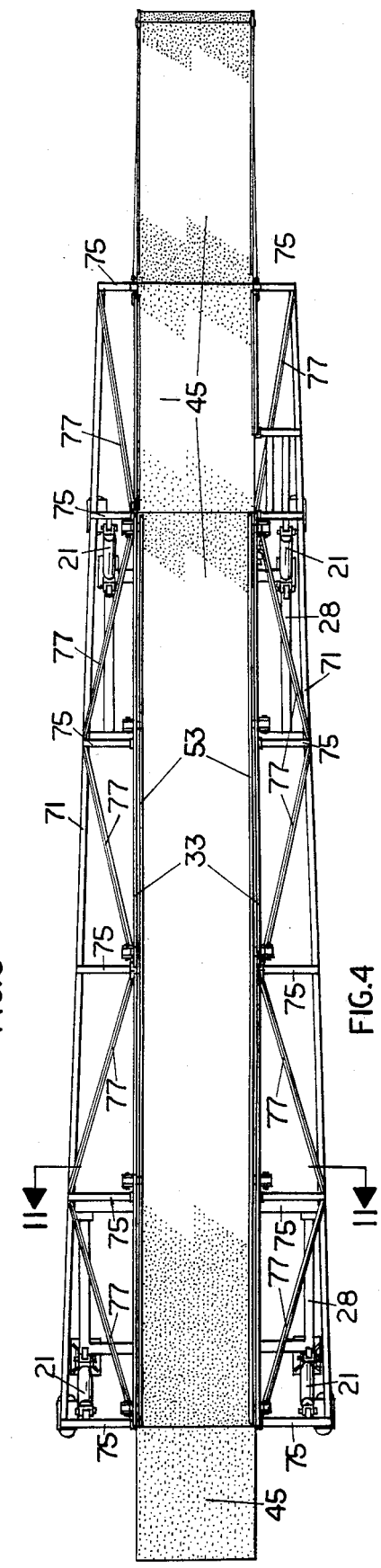

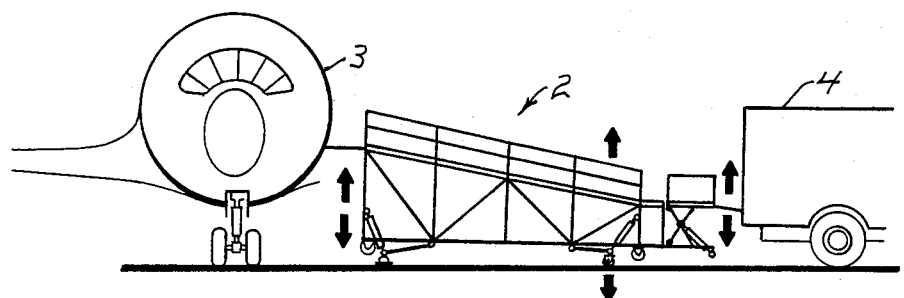
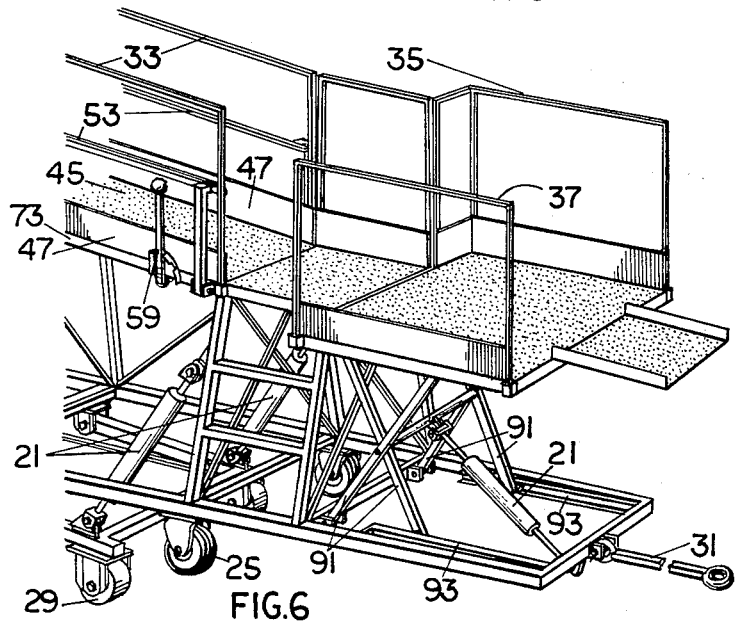
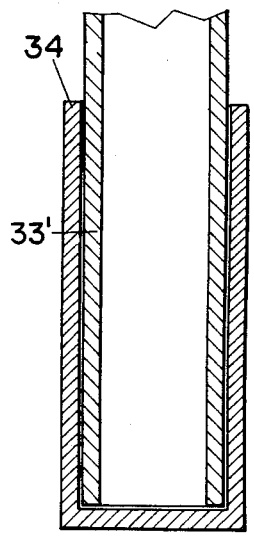
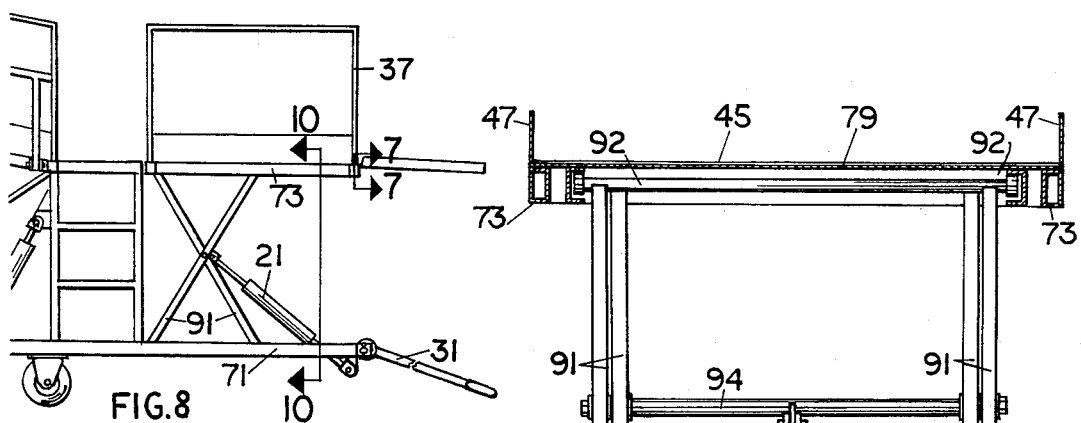
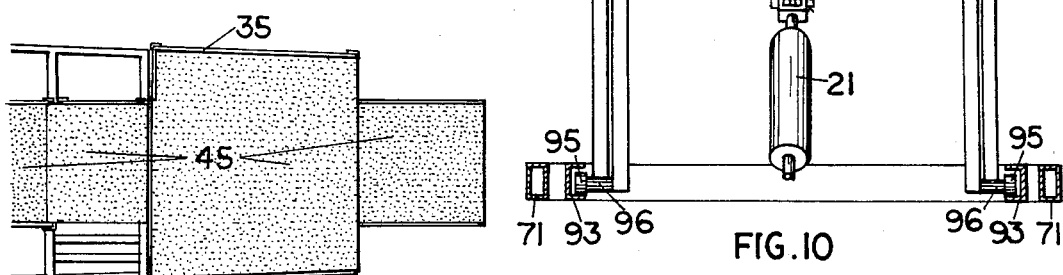

… … …

CARGO HANDLING RAMP

FIELD OF THE INVENTION

This invention relates to cargo handling and more particularly to a ramp for use in loading and unloading cargo from vehicles.

BACKGROUND OF THE INVENTION

In the past there have been numerous problems involved in loading and unloading cargo on, for example, aircraft or trucks. This invention is of an improved ramp for use in loading and unloading such equipment with standard size containers for cargo.

SUMMARY OF THE INVENTION

It is a general object of this invention to provide an improved cargo ramp which includes an inclined walkway which is adapted to be tilted to raise and lower the lower end relative to the upper end and wherein a brake mechanism is provided to control downward movement of wheeled standard size containers on the walkway and wherein the device is an overall improvement of those heretofore used in the trade.

In accordance with these general objects, the instant invention will now be described with reference to the accompanying drawings in which:

DESCRIPTION OF THE DRAWINGS

FIG. 3 is a side elevation view of the ramp shown in FIG. 2;

FIG. 4 is a top plan view of the ramp shown in FIGS. 2 and 3;

FIG. 5 is a schematic view illustrating an alternative embodiment of the instant invention wherein a lift mechanism is provided for cargo at the lower end of the ramp;

FIG. 6 is a perspective view illustrating the right-hand side of the ramp shown in FIG. 5 and illustrating the lift mechanism;

FIG. 7 is a view in cross section of that portion of FIG. 8 with the arrowed line 7—7 therearound;

FIG. 8 is a partial elevation view illustrating the operation of the apparatus shown in FIG. 6;

FIG. 9 is a top plan view of the right-hand side of FIG. 8;

FIG. 10 is a view taken on the plane indicated by the line 10—10 and looking in the direction of the arrows;

DESCRIPTION OF THE PREFERRED EMBODIMENT

Figure 1:
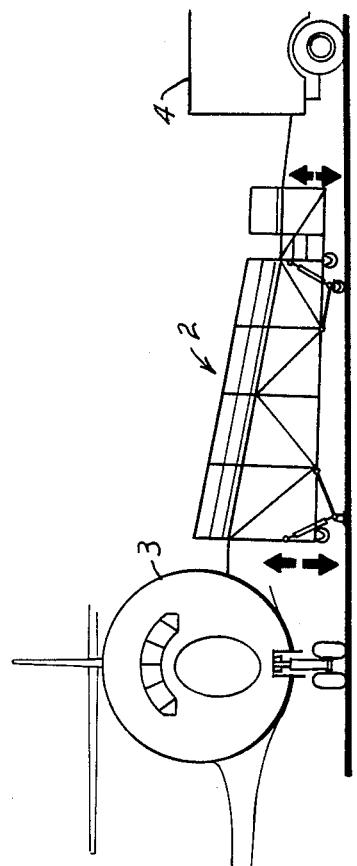
FIG. 1 is a schematic view illustrating the use of the instant invention.
Figure 2:
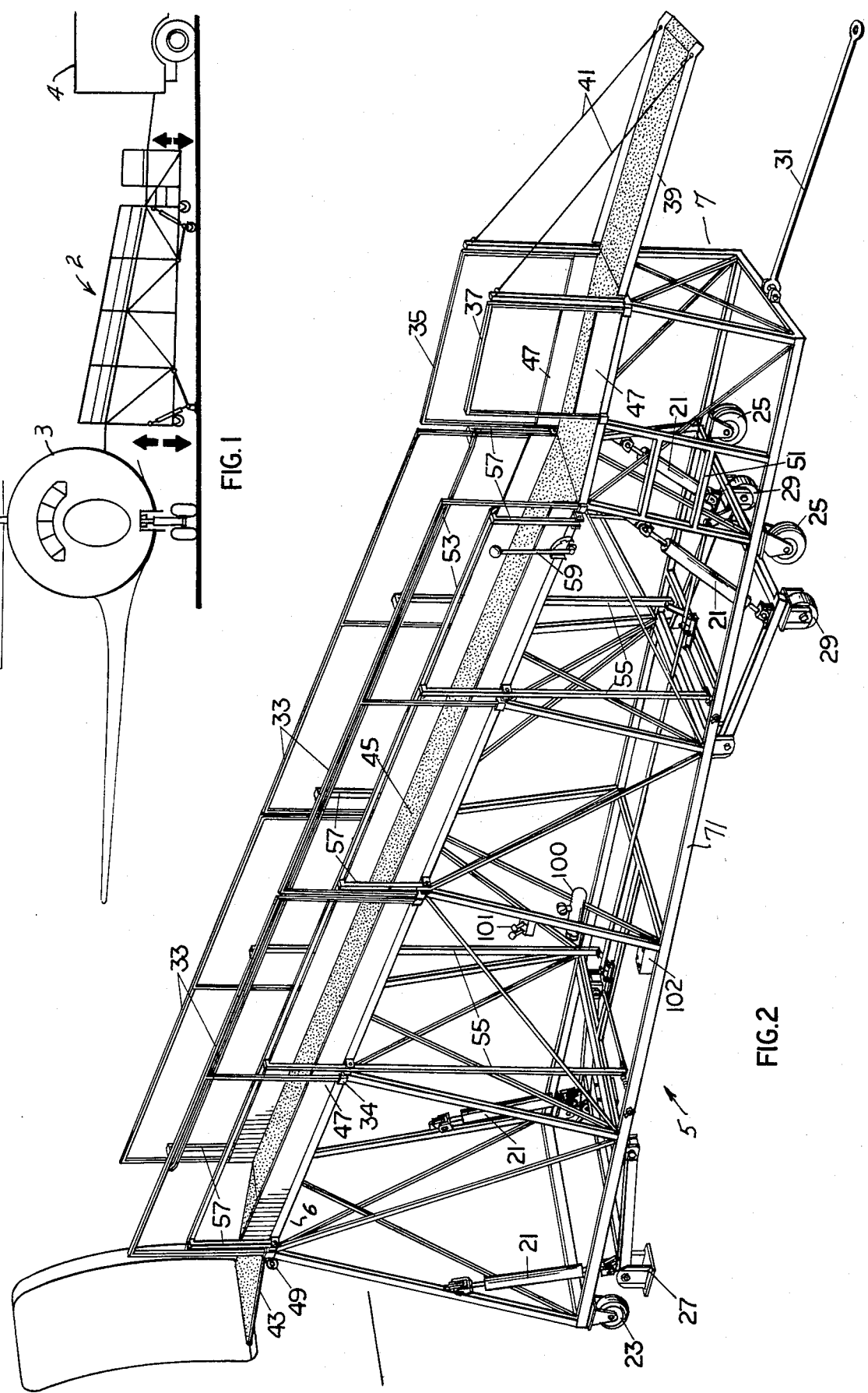
FIG. 2 is a perspective view of one embodiment of the ramp of the instant invention.

Referring to FIG. 1, the cargo ramp 2 is illustrated in use with an aircraft 3 and a truck 4. As seen in FIG. 2, the ramp is composed of a support frame 5 which has an elevated or higher end 6 and a lower end 7. This frame supports an inclined walkway 45. The frame is provided with spaced depending outwardly, downwardly diverging support legs 75 which are braced by members 77 with the legs 75 and 77 terminating the coplanar relation and being rigidly connected as by welding to lower frame portion 71 that is normally in a generally horizontal attitude. The lower frame portion 71, and the lift in FIG. 2, at the elevated end 6, is provided with a pair of roller means 23. Similarly, the lower end at the right of FIG. 2 is provided with a pair of roller means 25. These roller means permit the ramp to be easily rolled into position for use. A tow bar 31 is also provided for this purpose.

Figure 11:
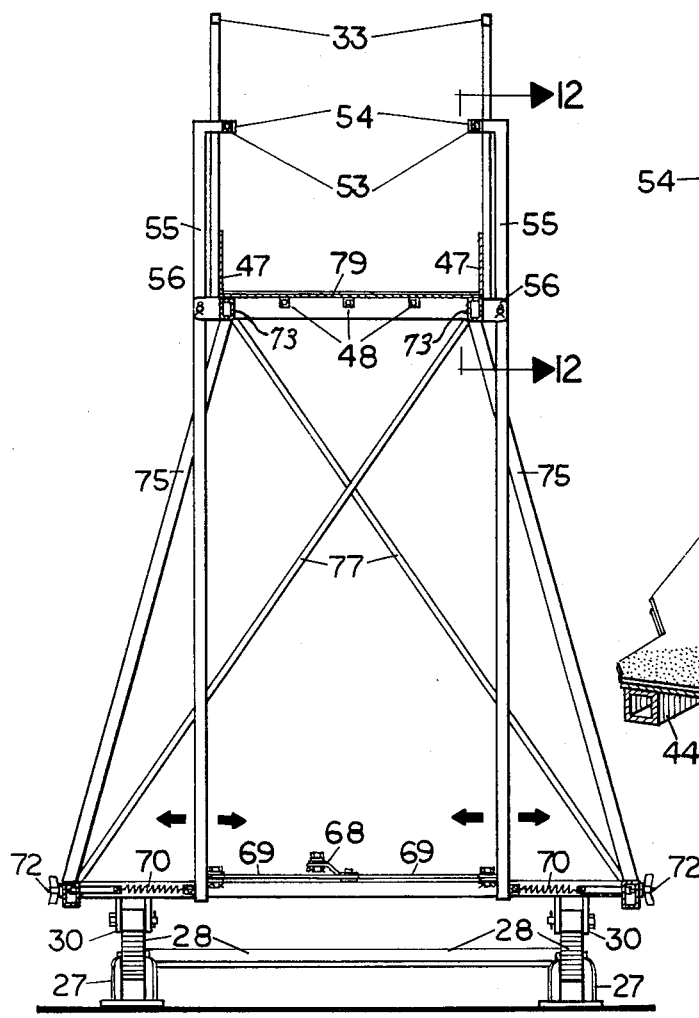
FIG. 11 is a view taken on the plane indicated by the line 11—11 in FIGS. 3 and 4 and looking in the direction of the arrows this view illustrates the operation of a braking mechanism to be described.

The walkway 45 is preferably covered with a friction surface as illustrated. Further, with reference to FIG. 3, it is seen that the walkway is composed of a floor which is supported on an upper frame structure. This upper frame structure is composed of coplanar frame members 73 that define the inclined plane and which join the upper ends of the support legs 75. Longitudinally extending runners 48 (FIG. 11) are also provided along the under portion of the floor or walkway 45.

Figure 12:
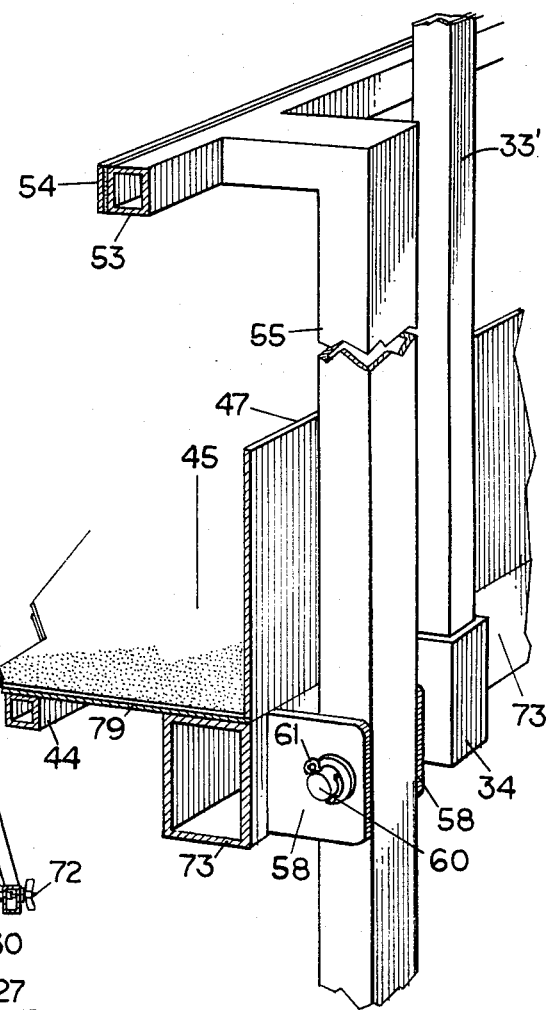
FIG. 12 is a partial perspective view illustrating some structure of FIG. 12 indicated by the arrowed line 12—12.

Along the walkway, a handrail structure 33 is provided, as shown in FIG. 3. As best shown in FIGS. 17 and 12, downwardly extending legs, 33' are received in telescoped relation within in sockets 34. These sockets are welded at spaced locations along the edges of the upper frame structure 73. Also along these edges upstanding guide plates 47 are provided.

At the elevated end at the left in FIG. 3, a flap 43 is provided which has a support 44. It is hingedly connected as at 49 to the upper frame structure. At the lower ramp end, the walkway terminates at a portion which is not inclined and which is provided with hand rails 35 and 37, there being a gap in the handrail 37 for access by means of a ladder 51. Preferably a hingedly connected ramp extension 39 with a pair of support cables 41 are also provided at the lower end.

Once the ramp has been moved into position for use, as in FIG. 1, it is fixed in that position by a structure now to be described. Also, in use, a mechanism permits the lower end of the ramp to be raised or lowered as will also be described.

Referring to the left of FIGS. 2 and 3, a position loading means is provided, at the elevated end, beneath the frame lower portion, including a pair of feet 27. These feet are connected by a pivot arm 28 to pivot connections 30 on the frame lower portion 71, see FIG. 3. The feet may be raised or lowered by use of the piston 21 which is hydraulically connected to a pump 100 energized by a battery 102 and operated by controls 101. When the ramp has been positioned for use, the piston is operated to lower the feet, see the FIG. 2 position. It thus cannot roll out of position.

At the lower end, a similarly structured slope adapting means is provided which includes piston 21, link arm 28, and pivot connection 30. Roller means 29 are provided on the ower end link arm 28 actuation of piston and link arm combination 21, 28, such as shown in FIG. 2, causes upward movement of the lower end of the walkway.

It is thus seen that when in position, the incline or slope of the walkway may be adjusted by raising or lowering the lower end. For example, if relatively heavy containers are to be rolled up the walkway, the lower end is raised to adjust the angle of slope of this walkway.

Figure 13:
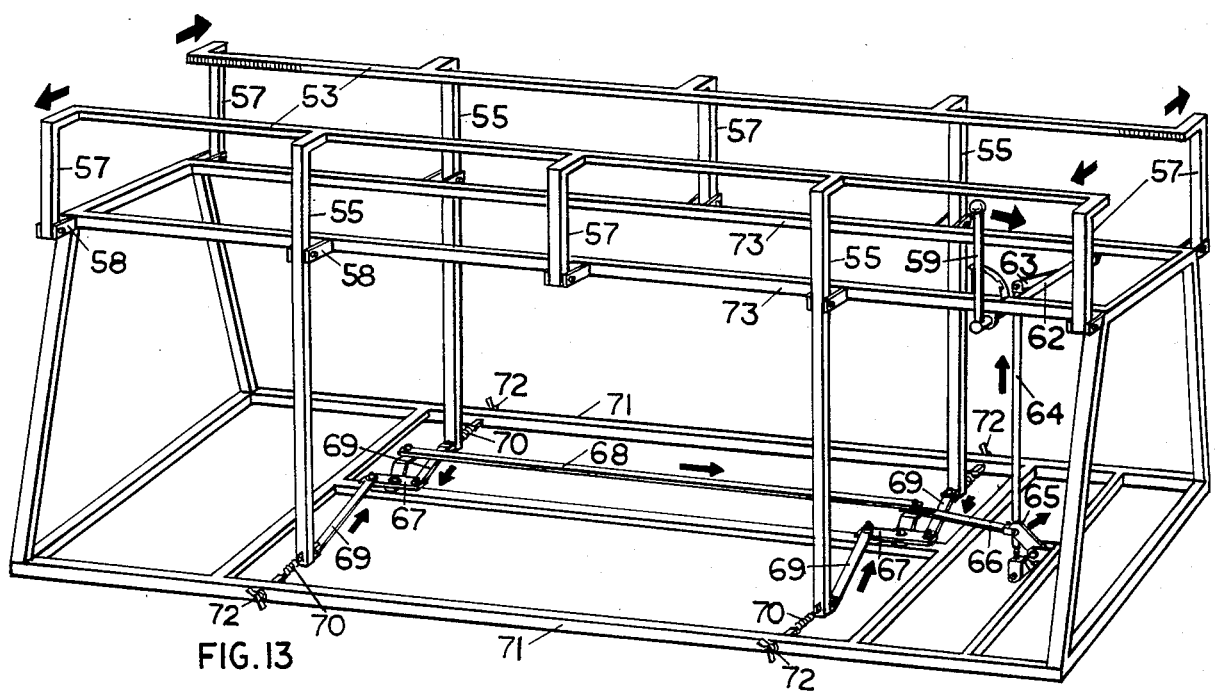
FIG. 13 is a partial view illustrating the operation of the mechanism for braking.

The device also includes a cargo brake mechanism so that weeled containers do not run wildly and dangerously down the walkway. This mechanism controls the rate of movement of such containers in a manner now to be described. The brake mechanism or control mechanism will best be understood on reference to FIGS. 11, 12 and 13. First as to structure, the brake mechanism is composed of a pair of rub rails 53, preferably provided with a rubbery outer cargo container contacting surface 54. The rub rails are carried on pivotal pairs of depending support legs, see FIG. 13. Preferably these are two pairs of long ones 55 and three pairs of short ones 57. As shown in FIG. 12, the lower ends of these pivotal legs are pivotally connected to the upper frame structure as at the clevis 58 connected to the frame by pivot pins 60 secured by a cotter pin 61. Thus, as seen in FIG. 13, the rub rails are pivotal into and out of partial blocking relation of the walkway. The rub rails are normally urged inwardly by tension springs 70 which pull the lower end of the longer legs outwardly with respect to the lower portion 71 of the frame, pivoting the rub rails toward one another and thereby constricting the walkway passage. Tension adjusting means are provided in the form of screws 72 for these springs. Means are also provided to relieve the brake i.e., retract the rub rails. This means will best be understood in reference to FIG. 13 on which arrowed lines have been applied to aid in following the description of the mechanism. On the lower frame, bell crank means 67 are pivotally supported on vertical pivots. A link 68 connects these bell cranks so that they operate together. The bell cranks are adapted to be turned by the following mechanism using the operator 59. The operator 59, accessible on the walkway adjacent the lower end, is keyed to a bar 62 so that rotation of the bar swings the arm 63 to raise or lower the vertical bar 64 thereby rotating the link 65 and pulling the arm 66 which in turn pivots the bell crank 67. Because the ends of this crank 67 are pivotally connected to the links 69 and the lower ends of the longer support legs 55, the rub rails can be pivoted to retract them from the normal braking position. It is thus seen that in this manner the rate of descent or movement of wheeled cargo containers can be controlled.

FIGS. 5–10 illustrate a somewhat modified lower end of an alternative embodiment. This embodiment provides a lift at the lower end. It includes a scissor mechanism 91. It is operated on movement of a hydraulic piston 21. The lower frame portion and the upper frame structure are each provided with guide tracks 93 for rollers 95 on the upper and lower legs of the scissor mechanism as they move in scissor fashion with respect to the scissor mechanism leg pivot 94. In this embodiment the lift accommodates loading of the lower end of the ramp from a ground supply of cargo.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A cargo handling ramp comprising:
   (a) a frame including an elongated walkway disposed along an upper portion thereof and said walkway including a higher end and a lower end,
   (b) a plurality of legs extending substantially from said walkway downwardly and terminating at a lower frame portion,
   (c) roller means secured in movably supporting relation to said frame and beneath said lower frame portion and disposed and structured to accommodate movement of said ramp,
   (d) a position locking means connected to said frame and structured to secure said ramp against lateral movement over a surface on which it is mounted,
   (e) incline adjusting means connected to said frame substantially adjacent said lower end of said walkway an including means for positioning said incline adjusting means into frame supporting relation relative to the surface on which said ramp is mounted, said incline adjusting means disposed and structured for selective raising and lowering of the lower end relative to the surface, whereby an inclined, angular orientation between said higher end and lower end may be varied,
   (f) braking means comprising two rub rails each having an elongated configuration and disposed in substantially parallel, spaced apart relation and extending along the length of said walkway on opposite sides thereof, said rub rails movably connected to said frame and positionable relative to one another into and out of engaging relation to carriers traveling along said walkway, and
   (g) said braking means further compirising means to normally position said rub rails into the constricting relation to carriers traveling along the length of the walkway between said rub rails.

2. A cargo handling ramp as in claim 1 wherein said means to normally position said rub rails comprises biasing means disposed and structured to normally bias said rub rails toward one another and into said engaging, constricting relation to carriers passing between said rub rails and along the length thereof and said walkway.

3. A cargo handling ramp as in claim 2 wherein said rub rails are pivotally mounted on said frame and said braking means further comprises means to pivotally move said rub rails relative to said frame and away from one another and out of said constricting relation to carriers traveling therebetween and along the length of said walkway.

4. A cargo handling ramp as in claim 1 wherein said inclined adjusting means comprises an arm means movably mounted on said frame and including a roller structure connected thereto and disposed for engagement with the surface on which said ramp is mounted, means for positioning said arm means in substantially outward position relative to said frame and for positioning said roller structure into engagement with the mounting surface, said arm means and roller means disposed in frame supporting position relative to the mounting surface, whereby said roller means is connected to said lower frame portion and positionable out of engagmeent with the mounting surface.

5. A cargo handling ramp as in claim 1 further comprising a lift mechanism connected to said frame adjacent said lower end thereof and including a substantially horizontally oriented platform selectively movable relative to and independent of said frame in a vertical direction relative to the surface on which said ramp is mounted, whereby said platform is vertically positionable relative to the frame independent of raising or lowering the lower end of said frame to adjust the incline of said walkway.

6. A cargo handling ramp as in claim 1 wherein said position locking means is connected to said frame substantially adjacent said higher end of said walkway and including a pair of feet pivotally connected to the lower frame portion adjacent the upper end of the walkway and means for lowering the feet to transfer the weight of said upper end from the roller means to the feet.

7. A cargo handling ramp as in claim 1 further comprising a first platform hingedly connected to the frame at the higher end of said walkway for extending the length of said walkway and a second platform extending from the lower end of said walkway and positionable to extend the length of the walkway.

8. A cargo handling ramp comprising:
 (a) a frame including an elongated walkway disposed along an upper portion thereof and said walkway including a higher end and a lower end,
 (b) a plurality of legs extending substantially from said walkway downwardly and terminating at a lower frame portion,
 (c) roller means secured in movable supporting relation to said frame and beneath said lower frame portion and disposed and structured to accommodate movement of said ramp,
 (d) a position locking means connected to said frame and structured to secure said ramp against lateral movement over the surface on which it is mounted,
 (e) incline adjusting means connecting to said frame substantially adjacent said lower end of said walkway and including means for positioning said incline adjusting means into frame supporting relation realtive to the surface on which said ramp is mounted, said incline adjusting means disposed and structured for selective raising and lowering of the lower end of the walkway relative to the surface on which the ramp is mounted, whereby an inclined, angular orientation between said higher end and lower end of said walkway may be varied,
 (f) a lift mechanism connected to said frame adjacent said lower end thereof and including a substantially horizontally oriented platform selectively movable relative to and independent of said frame in a vertical direction relative to the surface on which the ramp is mounted, whereby said platform is virtually positionable relative to the frame and independent of raising or lowering said lower end of said walkway to adjust the incline thereof, and
 (g) a braking means comprising two rub rails each having an elongated configuration and disposed in substantially parallel, spaced apart relation and extending along the length of said walkway on opposite sides thereof, said rub rails movably interconnected to said frame and positionable relative to one another and into and out of constricting relation to carriers traveling along said walkway.

9. A cargo handling ramp as in claim 8 wherein said braking means further comprises means to normally position said rub rails into the constricting relation relative to carriers traveling along the length of said walkway and between said rub rails.

10. A cargo handling ramp as in claim 9 wherein said means to normally position said rub rails comprises biasing means disposed and structured to normally bias each of said rub rails towards one another and into said engaging, constricting relation to carriers passing between said rub rails and along the length thereof and said walkway.

11. A cargo handling ramp as in claim 10 wherein each of said rub rails are pivotally mounted on said frame and said braking means further comprises means to pivotally move said rub rails relative to said frame and away from one another and out of said constricting relation to carriers traveling therebetween and along the length of said walkway.

* * * * *